US012617477B2

(12) United States Patent
O'Rourke

(10) Patent No.: US 12,617,477 B2
(45) Date of Patent: May 5, 2026

(54) CONFIGURABLE TRUCK RACK SYSTEM

(71) Applicant: John Walter O'Rourke, Tampa, FL (US)

(72) Inventor: John Walter O'Rourke, Tampa, FL (US)

(73) Assignee: John Walter O'Rourke, Tampa, FL (US)

( * ) Notice: Subject to any disclaimer, the term of this patent is extended or adjusted under 35 U.S.C. 154(b) by 316 days.

(21) Appl. No.: 18/417,967

(22) Filed: Jan. 19, 2024

(65) Prior Publication Data

US 2024/0246617 A1 Jul. 25, 2024

Related U.S. Application Data

(60) Provisional application No. 63/440,700, filed on Jan. 24, 2023.

(51) Int. Cl.
*B62D 33/02* (2006.01)

(52) U.S. Cl.
CPC ................................. *B62D 33/0207* (2013.01)

(58) Field of Classification Search
CPC .................................................. B62D 33/0207
USPC ............. 224/405, 402, 310, 320, 321; 296/3
See application file for complete search history.

(56) References Cited

U.S. PATENT DOCUMENTS 4,057,281 A * 11/1977 Garrett ....................... B60P 7/00
224/42.32
4,081,095 A * 3/1978 Wilburn .................. B60R 9/042
414/522

4,446,998 A * 5/1984 Taig ........................ B60R 9/042
224/310
5,108,141 A * 4/1992 Anderson ................. B60R 9/00
296/3
5,143,415 A * 9/1992 Boudah ..................... B60R 9/00
224/325
5,190,337 A * 3/1993 McDaniel ................. B60P 3/42
296/3
6,308,874 B1 * 10/2001 Kim ........................ B60R 9/042
224/310
6,338,427 B1 * 1/2002 Aftanas ................... B60R 9/045
224/310
6,347,731 B1 * 2/2002 Burger ..................... B60R 9/00
224/403

(Continued)

*Primary Examiner* — Justin M Larson
*Assistant Examiner* — Lester L Vanterpool
(74) *Attorney, Agent, or Firm* — Wei Yu; Dentons Cohen & Grigsby P.C.

(57) ABSTRACT

This is a configurable truck rack system designed with a rack platform, a number of posts, and a number of corresponding base plates, which can be installed on a truck bed. The rack platform comprises a sliding rail, a fixed rail, and a plurality of crossmembers, wherein the sliding rail is attached to the fixed rail through a number mounting brackets secured by a plurality of tension release knobs and locking nuts. The truck rack platform is configured such that a slide layer is placed between the sliding rail and the fixed rail. The truck rack platform and the posts can be removed from the truck and converted into a workbench, through the addition of a work surface attachment. The truck rack platform is designed such that the sliding rail can move bi-directionally and extend over the rack platform in order to accommodate larger items.

20 Claims, 10 Drawing Sheets

(56) References Cited

U.S. PATENT DOCUMENTS

| | | | | |
|---|---|---|---|---|
| 6,659,524 B1 * | 12/2003 | Carlson | B60P 1/003 | |
| | | | 414/522 | |
| 6,883,849 B2 * | 4/2005 | Hebert | B60P 1/003 | |
| | | | 224/403 | |
| 7,011,239 B2 * | 3/2006 | Williams | B60R 9/042 | |
| | | | 224/310 | |
| 7,134,831 B2 * | 11/2006 | Risser | B60P 1/5442 | |
| | | | 254/2 R | |
| 7,513,548 B1 * | 4/2009 | Win | B60P 3/40 | |
| | | | 296/3 | |
| 8,322,582 B2 * | 12/2012 | Flaherty | B60R 9/00 | |
| | | | 224/403 | |
| 8,365,969 B2 * | 2/2013 | Johnson | B62J 7/08 | |
| | | | 280/654 | |
| 8,640,933 B1 * | 2/2014 | McCray | B60R 9/042 | |
| | | | 224/325 | |
| 8,777,288 B2 * | 7/2014 | Johnasen | B60R 9/08 | |
| | | | 296/3 | |
| 9,227,491 B1 * | 1/2016 | Story, Jr. | B60J 7/041 | |
| 9,387,891 B2 * | 7/2016 | Richins | B60P 1/003 | |
| 9,586,629 B2 * | 3/2017 | Leitner | B60R 9/06 | |
| 10,005,402 B2 * | 6/2018 | Huang | B60R 9/042 | |
| 10,189,417 B1 * | 1/2019 | Morken | B60R 9/042 | |
| 10,246,025 B1 * | 4/2019 | Knigge | B60R 9/042 | |
| 10,286,853 B1 * | 5/2019 | Carbone | B60P 1/003 | |
| 10,800,339 B2 * | 10/2020 | Anderson | B60R 9/058 | |
| 11,292,400 B2 * | 4/2022 | Spencer | B60R 11/06 | |
| 11,560,183 B2 * | 1/2023 | Agarwal | B60P 1/003 | |
| 2002/0014504 A1 * | 2/2002 | Hetu | B60R 9/042 | |
| | | | 224/310 | |
| 2006/0065685 A1 * | 3/2006 | Fitzsimmons | B60R 9/042 | |
| | | | 224/310 | |
| 2019/0329712 A1 * | 10/2019 | Howell | B60R 9/06 | |
| 2020/0406826 A1 * | 12/2020 | Ni | B60R 9/058 | |

* cited by examiner

200

300

600

CONFIGURABLE TRUCK RACK SYSTEM

CROSS REFERENCE TO RELATED APPLICATION

This application claims the benefit under 35 U.S.C. § 119(e) of U.S. Provisional Application No. 63/440,700 entitled "CONFIGURABLE TRUCK RACK SYSTEM" filed Jan. 24, 2023, which is incorporated herein by reference.

BACKGROUND

The US Department of Transportation estimates 20% of the vehicles in operation today are pickup trucks. 17% of all new vehicle registrations are for pickup trucks. Sales figures for pickup trucks have increased each year, from 2 million in 2018 to 3 million in 2020. Registration data for pickup trucks in 2018 was 47.1 million and in 2019 registrations rose to 48 million.

While there is no regulatory data exists regarding the number of pickup trucks that have racks installed over the bed of the vehicle exists, an informal survey conducted by the Applicant indicated appx. 35 out of 100 pickups trucks had some type of rack system affixed to the truck. These racks have varying designs, are made of various types of materials, and constructed using various methodologies. At the retail level the cost for a rack system ranges from $300 to over $2,500.

Current manufactures do not offer a full scope multi-dimensional rail system. Most systems are designed for either the commercial or recreational market and lack "crossover" capabilities. Current market offers racks in a fixed or predetermined configuration with most rack systems being welded and made from round pipe or singular tube design. Most existing systems have a fixed crossbeam near the tailgate area, which prevents loading of oversized items such as refrigerators, mattress, box springs, tall furniture or other larger oversized items.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

This is truck rack system designed with a rack platform, a number of posts, and a number of corresponding base plates, which can be installed on a truck bed. The rack platform comprises a sliding rail, a fixed rail, and a plurality of crossmembers, wherein the sliding rail is attached to the fixed rail through a number of mounting brackets secured by a plurality of tension release knobs and locking nuts. The truck rack platform is configured such that a slide layer is placed between the sliding rail and the fixed rail. The crossmembers are removably fixed onto the sliding rail and the fixed rail, a plurality of posts, wherein the fixed rail comprises a corresponding number of mounting holes, such that the plurality of posts inserts into the plurality of mounting holes, and a plurality of base plates, wherein the plurality of posts are removably attached to the base plates. The truck rack platform and the posts can be removed from the truck and converted into a workbench, through the addition of a work surface attachment. The truck rack platform is designed such that the sliding rail can move bi-directionally and extend over the rack platform in order to accommodate larger items. The sliding rail can be formed by two half sliding rails that meet the length of the fixed rail, and each half sliding rail can move bi-directionally and independently.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
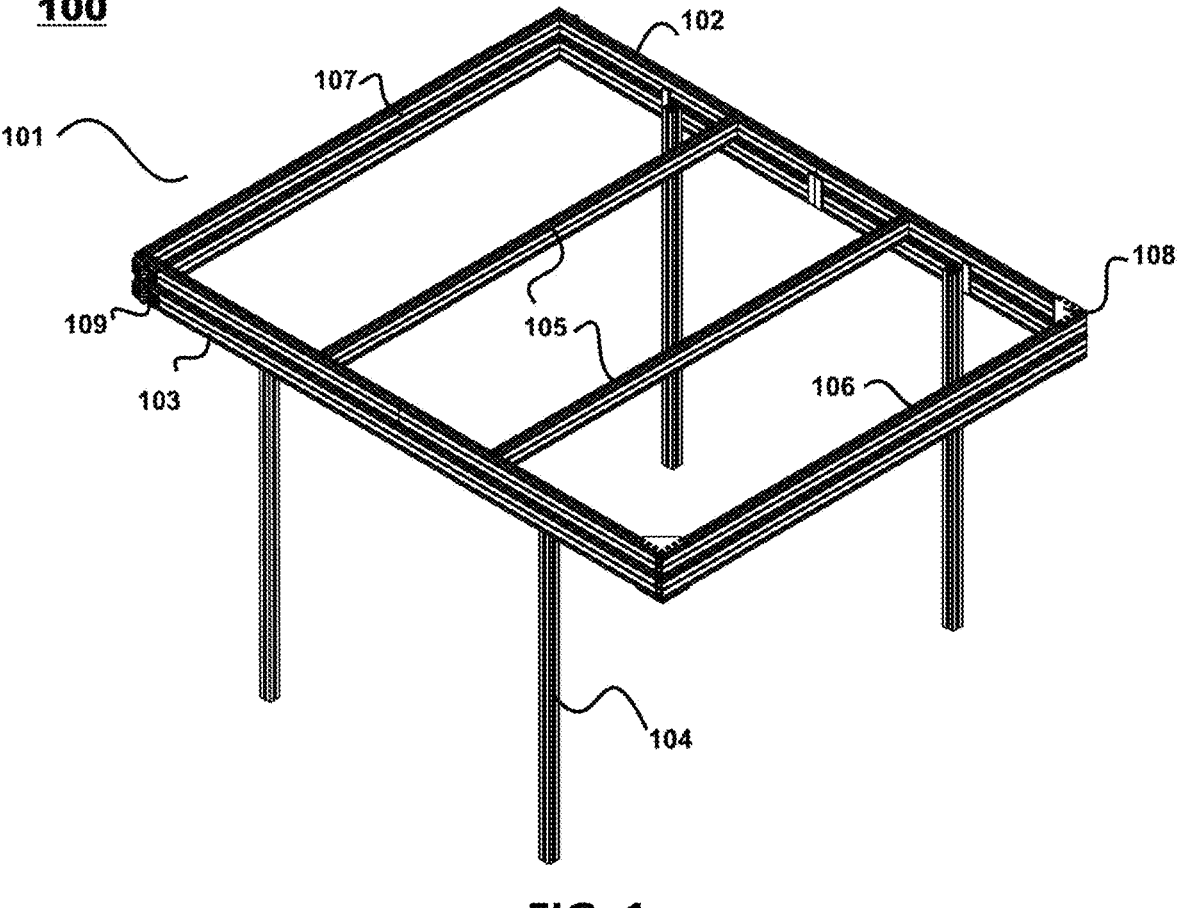
FIG. 1 is a perspective view of an embodiment of the configurable truck rack system.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

The versatile truck rack system is constructed using extruded aluminum, resulting in a strong lightweight rack or frame with versatility and flexibility to pickup truck owners and operators. Additionally, it allows for a series of items, such as cargo tie down hooks, battery operated lights, shade canopies and specialty designed mechanisms to secure items such as kayaks, canoes and bicycles.

The versatile truck rack system is designed to be adaptable to various sizes of cargo. The system allows for the carrying of "length cargo" such as ladders as well as recreational equipment such as canoes, kayaks or bicycles. The rack system is designed to bi-directionally expand both forward and backward to increase the capability to carry extra long items. This capability allows the operator to securely fasten items of greater length than that which would securely fit on a smaller overhead rack.

Existing truck racks that have a fixed crossbeams (usually welded or bolted) over the tailgate area of the truck and interior space of the truck bed would significantly reduce or prevent the loading of tall cargo, such as refrigerators, mattresses or furniture items, into the truck bed. The versatile truck rack system design allows for the loading of these types of taller items into the bed of the truck without having to remove the entire truck rack from the vehicle itself. Furthermore, the truck rack system provides a set of fastening devices, such as a set of cargo tie-downs or hooks, to secure these taller items and prevent them from tipping or falling over while the vehicle is in motion.

The rack system can be raised and lowered in height. The range of height adjustment can be from just above the sidewalls of a pickup truck to 48" above the top of the pickup bed frame. This feature permits easier load and unload capabilities for items that do not require being secured on the overhead rack.

The sidewalls of the rack system allow for items to be secured upright against the side of the truck. As an example, with the interior crossmembers removed it is easy to load mattresses into the bed of the truck and have them positioned against the exterior frame of the rack system. In such a position, the volume load capacity of the truck is significantly increased simply because the mattress remains upright and is not lying across the width of the truck bed.

The configurable truck rack system is designed to enable setting up shades and canopies on the truck bed. The versatility of the system also allows for the rack to be center point for the erection of a shade and rain protection system for the area immediately around the truck. This affords workmen a covered area in which they can setup their work stations, position saws or paint outside of direct sunlight or when it rains. For the recreational truck user and "tailgater," it offers a shaded area, wherein, they can set up chairs, tables, coolers, cots and televisions within a covered area. A tent fly or tarp can easily be affixed to the rack using a series of preinstalled eyelets and hooks while the end of the canopy can be secured to auxiliary poles using a variety of techniques; weights, buckets of sand, stakes and rope, thus creating the shaded area.

The versatility provided by using extruded aluminum channel as the frame for the rack, allows the operator to position cleats, cargo hooks and connectors in almost every part of the rack. Multiple types of tie down features can be accommodated, such as eyelets for ropes, bungees, straps, hooks, cleats and cargo nets. For example, battery operated lights can be secured to the rack frame to provide a well-lit space. Portable fans can be affixed to provide air circulation. PVC pipe can be affixed to provide a secure space for storing fishing rods. These are just a few of the examples to illustrate the versatility of the truck rack system.

It is possible to completely remove the entire rack simply by removing a set of linchpins which secure the rack to the base mounting plates, which are affixed to the truck itself. The truck rack system's lightweight construction ensures that it can maintain its structural integrity while being moved. Once removed from the truck, the rack can be positioned on the ground and utilized as a work-station with a surface attachment. This can provided by simply by attaching a piece of plywood atop the rack. This would provide the user with appx 35-40 sqft of worktable space.

The entire rack is made with extruded aluminum, which is lightweight, strong, versatile, flexible, and is corrosion resistant. Aluminum is ⅓ the weight of iron or steel yet it maintains a very high "strength to weight," ratio. Aluminum is also "non-sparking" thus it is safe to use around electricity.

The frame is secured to the pickup utilizing a post system that is incorporated into the sidewalls of the trucks bed frame. The posts can either be inserted directly into the sidewall frames using the built in "wells" or can be mounted atop the upper edge of the bed frame using a clamp system and further secured using a set of linchpins.

Additionally, while completely assembled and attached to the cargo rack, the four support posts can be removed from the truck by simply lifting the posts from the wells. Alternatively, this function can be achieved by unfastening the linchpins which secure the post to the clamped-on base plates which are fitted atop the upper bed of the truck. This process can easily be done in minutes by two individuals. Once removed from the truck the rack it can be installed on a different pickup or can easily converted to a sizable worktable by adding a sheet of plywood across the top of the frame. Alternatively, the track can be disassembled and stored by removing the attachment bolts and tension screws.

The base side rails bar can be adjusted vertically from the top of the truck bed to the top of the posts, thereby allowing the operator to access cargo at a lower overall height.

The upper rail system is composed of two sections; a base and a slide rail which can be extended bi-directionally toward the front or the rear of the vehicle. The top rail is movable in both directions—forward and backward to allow for over the cab storage and over the tailgate coverage. Top slide bar slides atop the bottom base bar in both a forward and rear direction to allow over the cab storage or to extend over the tailgate area. The bidirectional extension rail system provides extended length for carrying longer items when required. A silicon coated strip is inserted on areas where both bars meet to reduce metal on metal friction To allow movement, the top slide bar is connected to bottom Base Bar by tightening or loosening a moveable tension screw.

The front end crossmember for both the base rail and the sliding rail are secured with locking corner brackets.

The rear end of both the base rail and sliding rail are split to allow the crossmember rail to be opened in a "Swinging door" configuration. When opened the respective crossmembers rails can be opened for 180 to 270 degrees from their closed position. When in place the Crossmember is secured by a set of sliding locking bars which are secured using a set of tension screws.

As required by the operator, additional side and Crossmembers rails can be added to the rack system using locking bolts and screws.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring to FIG. 1, an embodiment of the versatile truck rack is shown. The truck track system is generally designated as 100. The truck rack system 100 comprises a rack platform 101, a number of support posts 104, a number of crossmembers 105, a front crossmember 106, and a rear crossmember 107. The rack platform 101 further comprises an upper slide rail 102 and a lower fixed rail 103. The front crossmember on one distal end of the rack platform 101 is affixed with secure locking corner brackets 108. By contrast, the rear crossmember 107 on the other distal end of the rack platform 101 is secured with hinges 109 that would facilitate an "swinging door" motion.

The support posts 104 are placed onto a number of corresponding base plates on the truck bed. The support posts 104 would be easily secured and removed from the corresponding base plates through a number of fastening means, such that the entire rack system 100 can be installed/removed from the truck beds easily. The fastening means comprise lynch pins inserted through both the support posts 104 and the corresponding base plates in the exemplary embodiment. Once removed, the rack system 100 can be converted into a workbench with a surface attachment.

The top sliding rails 102 can move bi-directionally on top of the fixed rails 103. The top sliding rails 102 are oriented on top of the fixed rails 103 such that they can forward and backward. This would allow the rack platform 101 to transform into a number of extended configurations for various application purposes. The top sliding rails 102 can comprise two sections, each of which can be adjusted independently of the other. In the exemplary embodiment, a silicon coated strip is inserted between the top sliding rails 102 and the bottom fixed rails 103, such that fiction and metal and metal contact are reduced. At max extension length, the top sliding rails 102 can essentially double the length of the rack, such that significantly increased coverage can be provided. The top sliding rails 102 attached to the front crossmember 106 can move independently from the top sliding rails 102 attached to the rear crossmember 107. In an exemplary embodiment, the top sliding rails 102 attached to the front crossmember 106 can be extended to be above the vehicle cab. Independently, the top sliding rails 102 attached to the rear crossmember 107 can be extended to beyond the length of the truck bed. It is foreseeable that a person skilled in the art can adapt sections of the top sliding rails 102 for specific application needs, so that length of the top sliding rails 102 can be varied. The extended configuration allows a user to secure items of lengthy dimensions to the extended top sliding rails and the fixed rails 103, such that transport of oversized items is afforded added stability.

The support posts 104 can be extended to elevate the sliding rails 102 and fixed rails 103 further above the truck bed. The sliding rails 102 and the fixed rails 103 comprise attachment means for securing a cover thereon, such that the cover can be extended to cover the vehicle, as well as areas surrounding the vehicle. It is envisioned that the cover area can be further extended with the expanded mode of the configurable truck rack system 100. The configurable truck rack system 100 can be untethered from the truck/vehicle and used as the anchor for a cover independently.

In the exemplary embodiment, the sliding rails 102 comprises attachment means to secure a working surface thereon. Thus, the configurable truck rack system 100 can be used to create a work station on or near the work truck or vehicle. In at least one embodiment, the support posts 104 are attached to a moveable mounting platform on the truck bed, such that the configurable truck rack system 100 can be automatically deployed and ready for conversion into a workstation.

Figure 2:
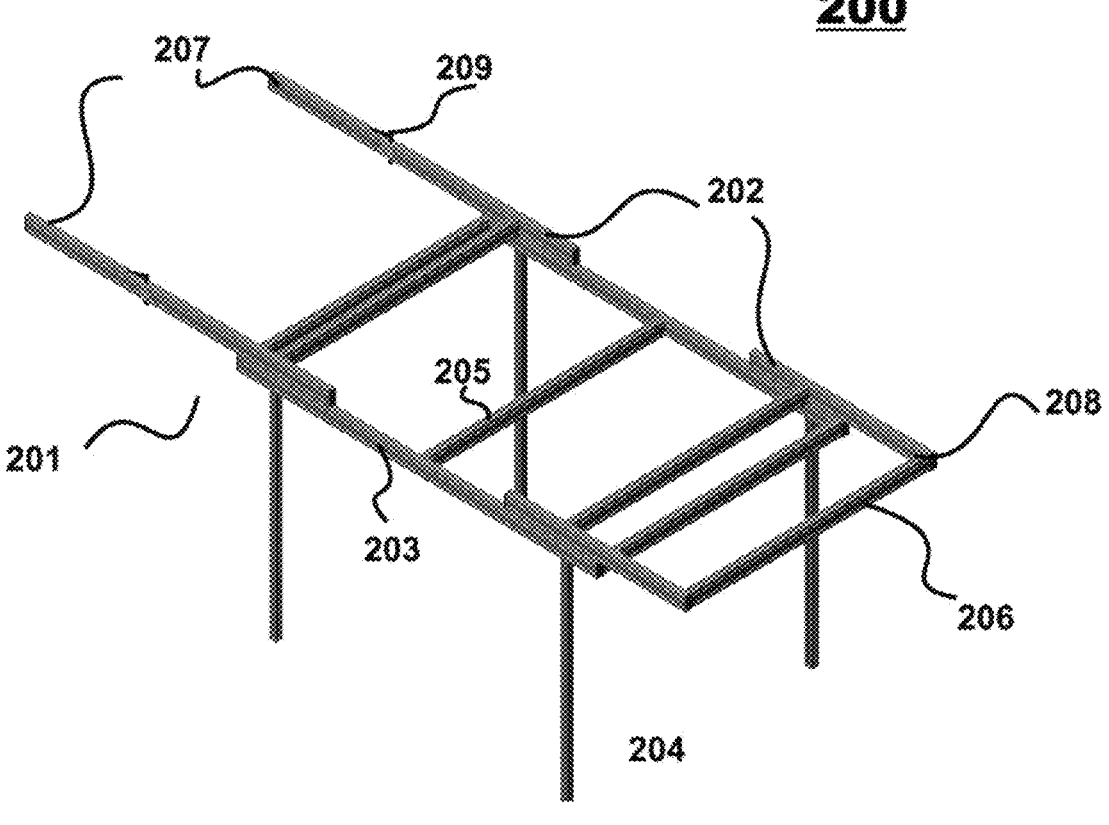
FIG. 2 is a perspective view of an embodiment of the configurable truck rack system in an open configuration.

Referring to FIG. 2, an open and extended configuration of the rack system is generally designated as 200. The rack system 200 can be the extended configuration of the rack system 100 shown in FIG. 1. The rack system 200 comprises a number of support posts 204, which can be fixed onto base plates on a truck bed. On top of the support posts 204 are the rack system 201, which comprises a pair of top sliding rails 202, a fixed rail 203, a number of removable crossmembers 205, a front crossmember 206 and a rear cross member 207. The front crossmember 206 are attached to the top sliding rails 202 with a pair of corner brackets 208. The rear crossmember 207 is separable into two sections, each with a distal end that is attached to the top sliding rails 202 with a hinge 209.

As shown in FIG. 2, the top sliding rails 202 are set up on top of the fixed rail 203 such that the top sliding rails 202 can move back and forth thereon. Two sections of the top sliding rails 202 can be configured to be in contact in the middle, such that the combined length of the top sliding rails match that of the fixed rail 203. In the exemplary embodiment, a silicon coated strip is placed between the top sliding rails 202 and the fixed rail 203 in order to minimize friction and facilitate movement. A stopper mechanism can be implemented on the silicon coated strip to stop either of the top sliding rails 202 from traveling beyond dimensions of the fixed rail. It is envisioned that each section of the sliding rails 202 travel independently, such that a number of configurations can be achieved in order to accommodate different loading requirements. For example, a ladder mounted on top of the expanded sliding rails 202 may be placed more forward or backward, depending on the vehicle and the weight distribution of the ladder.

In this exemplary embodiment, the front crossmember 206 is fixed onto the top sliding rails 202 through a pair of corner brackets 208. The rear crossmember 207 can be formed with two sections, each of which can be attached to the top sliding rails 202 with a hinge 209. The sections of the rear crossmember 207, along with the hinges 209, can allow rack platform 201 to open in a swinging door fashion. This configuration allows additional loading range and accommodate items with greater vertical height. The crossmember 205 can be one of the plurality of crossmembers to be fitted onto the fixed rail 203. In the exemplary embodiment, the crossmember 205 is removable. This provides flexible dimensions within the rack system 201, such that additional items with varied dimensions can be secured against the rack system 201 conveniently, without additional set up or components. It is envisioned that a number of crossmembers 205 can installed on the fixed rails 203 to accommodate and support additional products.

The support posts 204 are attached to base plates that are installed on the truck bed. As such the rack platform 201 can be raised or lowered, depending on the transport need of each item. In at least one embodiment, the support posts 204 are secured to the base plates through lynch pins. The rack platform 201, along with the support posts 204, can therefore be removed and transported from the truck bed to the ground. A surface attachment can be secured on top of the rack platform 201, such that the rack system 200 can be used as a workstation next to the vehicle.

Figure 3:
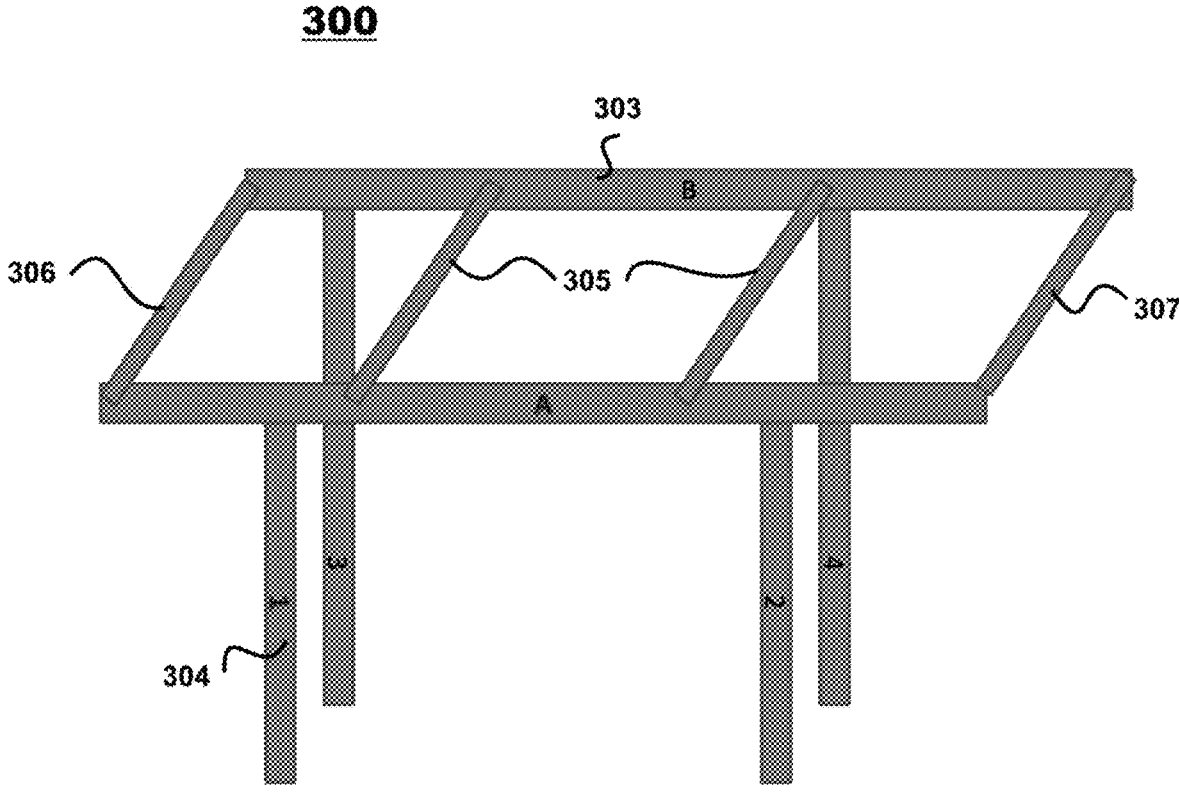
FIG. 3 is a side view of an embodiment of the configurable truck rack system.

Referring to FIG. 3, a sideview of the configurable truck rack is shown. The configurable truck rack 300 is shown to comprise a number of support posts 304, a fixed rails 303, a fixed crossmember 306, and a number of removable crossmembers 305 and 307. The fixed side rails 303 are designated as A and B, which can be the fixed rails 103 in FIGS. 1 and 203 in FIG. 2. The fixed crossmember 306 is positioned at one end of each of the horizontal side rails. The fixed crossmember 306 can be the front crossmember 106 in FIGS. 1 and 206 in FIG. 2. The removable crossmembers 305 are positioned at a set distance away from each other and the fixed crossmember 306. In the exemplary embodiment, the fixed crossmember 306 and the removable crossmembers 305 are positioned at equal distance from each other, wherein one removable crossmember 307 is positioned at the other distal end of each horizontal side rails. The crossmember 307 can be the rear crossmember 107 in FIGS. 1 and 207 in FIG. 2.

Figure 4:
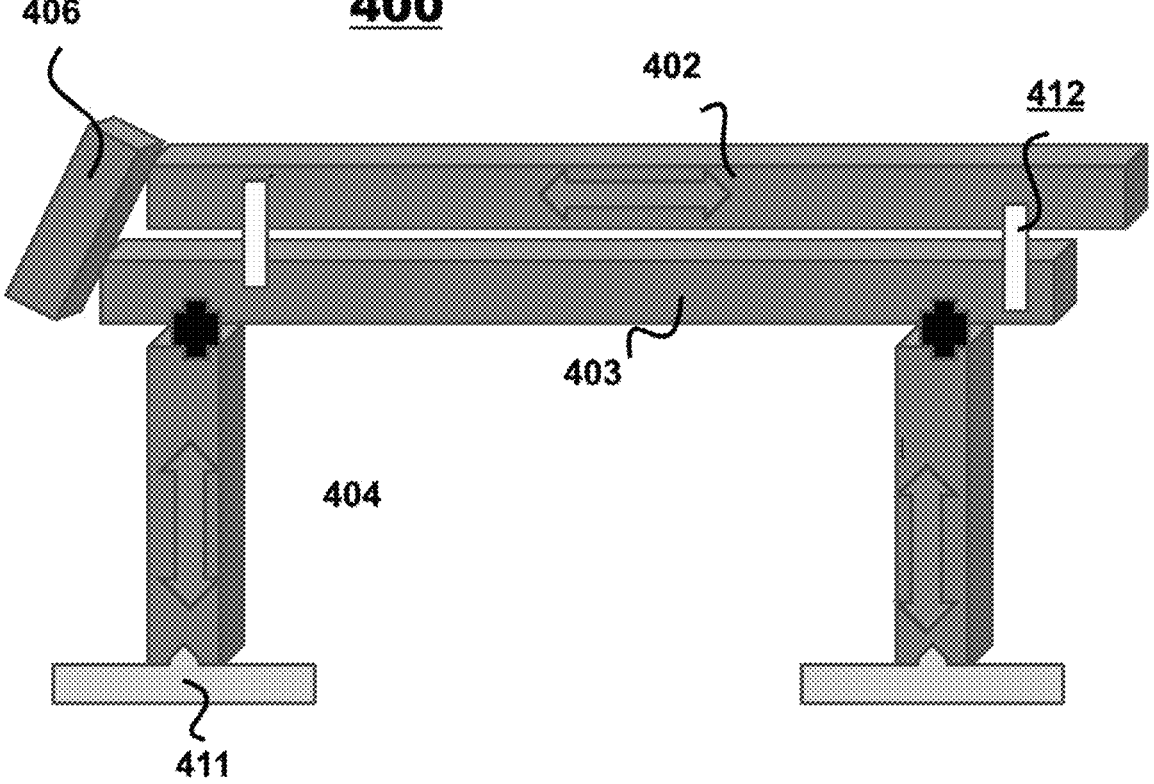
FIG. 4 is a side view of an embodiment of the configurable truck rack system with a crossmember and base plates.

Referring to FIG. 4, a sideview of the configurable truck rack construction is shown and generally designated as 400. This embodiment of the truck rack 400 is viewed with reference to the configurable truck rack 100 in FIG. 1. Each post 404 of the configurable truck rack 400 can correspond to a support post, wherein a base plate 411 is attached to each of the post 404. Each base plate can be installed on a truck bed, such that the configurable truck rack can be mounted onto the truck bed. Each post 404 can be secured to the base plate 411 through a fastening means. In the exemplary embodiment, the fastening means comprise a lynch pin, wherein the attachment and removal of the post 404 does not require specialized or additional tools.

The configurable truck rack 400 can be constructed with a base rail or bar 403 and a side rail or bar 403. The side rails 402-3 are designed to be able to extend, position, and orient according to specific needs of each application. It is understood that a person with ordinary skills in the art is able to adapt the construction concept described herein to better suit the requirement of each user and application scenario.

In the exemplary embodiment, the base bar 403 and the slide bar 402 are oriented parallel to each other with aid of tension screws 412. Tension screws 412 serve the purpose of securing the slide bar 402 to the base bar 403, such that the slide bar 402 cannot move freely without loosening of the tension screws 412. A tension screw connector is affixed to the tension screw 412, such that tension screws 412 can be tightened and loosened in relation to surface of the base bar 403 and slide bar 402. In an exemplary embodiment, a silicon strip is installed between the slide bar 402 and the base bar 403 to ease the sliding motion.

In the exemplary embodiment, the crossmember 406 can be oriented between the adjoining distal end of the slide bar 402 and the base bar 403. The crossmember 406 provides guidance for the slide bar 402 such that the slide bar 402 motion is limited to horizontal direction parallel to the base bar 403.

Figure 5:
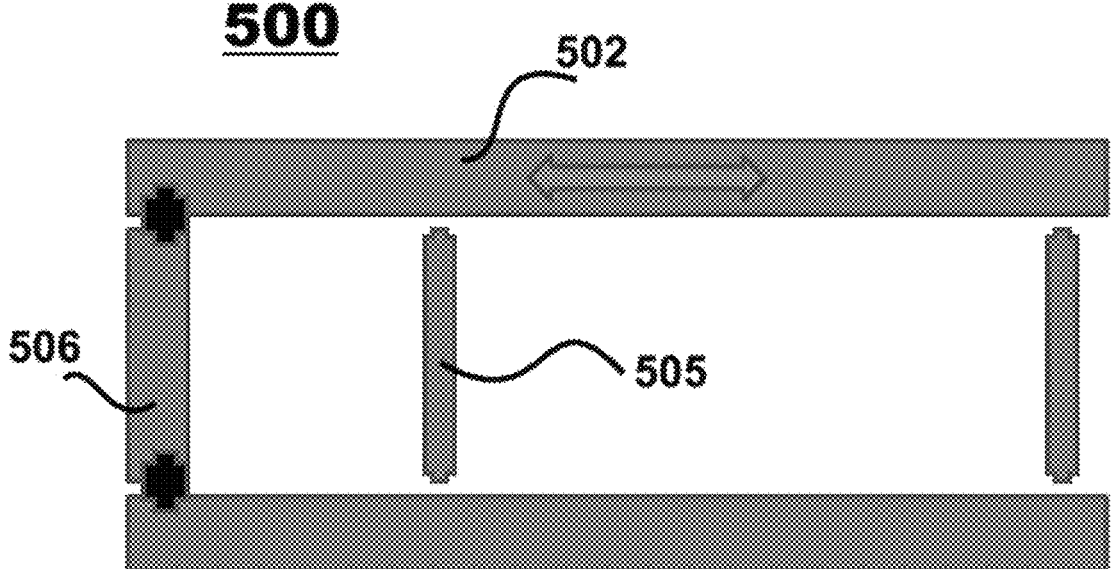
FIG. 5 is a top view of an embodiment of the configurable truck rack system.

Referring to FIG. 5, a top view of the slide rails is shown. The slide rails can be the slide bar 102 in FIG. 1, 202 in FIG. 2, and 302 in FIG. 3. The slide rails 502 mounted on top of a set of fixed rails are designed to move back and forth atop the fixed rails. The slide rails 502 are secured to the fixed rails with a tension screw system. The one distal end of the slide rails is secured and fixed, wherein in the exemplary embodiment by a crossmember 506 and connectors. The connectors can be the corner brackets 108 or hinges 109 in FIG. 1. There are a number of additional crossmembers 505.

In the exemplary embodiment, two crossmembers 505 are shown to be positioned between the two parallel slide rails 502. The crossmembers 505 are secured using a tension screw system. In other embodiments, additional crossmembers 505 can be added to increase overall strength of the system and allow increased load capacity.

Figure 6:
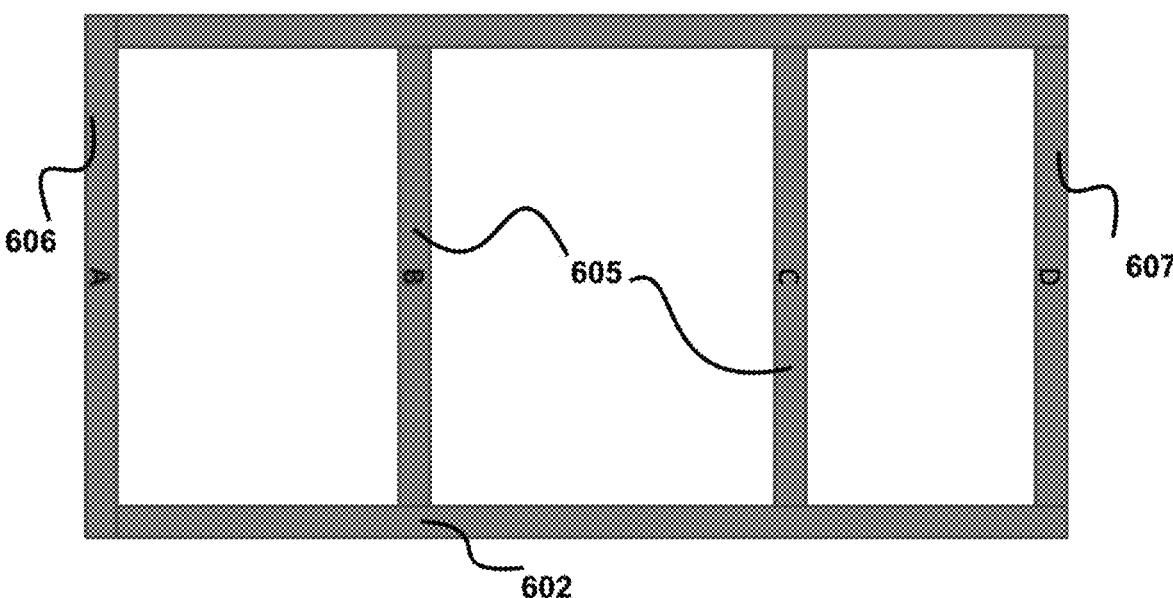
FIG. 6 is a top view of an embodiment of the configurable truck rack system with the rack platform.

FIG. 6 illustrates another top view of the slide rails assembly 600. The fixed crossmember 606 is secured to two parallel slide members through connectors, such as corner brackets in the exemplary embodiment. The fixed crossmember 606 can be the front crossmember 106 as shown in FIG. 1. One of the removable crossmembers can be the rear crossmember 607, which can be attached to the sliding rails 602 through hinges. The other removable crossmembers 605 are attached to the sliding rails 602 to accommodate transporting applications.

Figure 7:
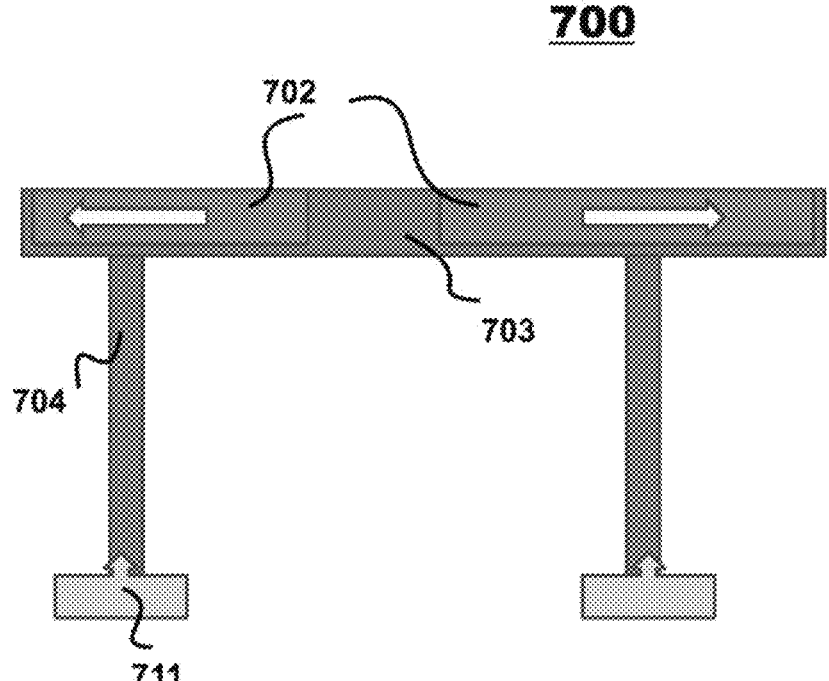
FIG. 7 is a side view of an embodiment of the configurable truck rack system with sliders.

Referring to FIG. 7, a side view of the truck rack system illustrates the movement and function of the sliding rail assembly. The truck rack assembly 700 is installed on a number of support posts 704 affixed to corresponding base plates 711 that are affixed onto a truck bed. The upper slide assembly 700 comprises sliding rails 702 that can move forward or rearward and a fixed rail 703. In the exemplary embodiment, the slide rail 702 can move both forward and rearward depending on user needs. In the exemplary embodiment, separate slide rails are used to facilitate the forward and rearward movement. The sliding rails 702 can be mounted adjacent to the fixed rails 703 in parallel configuration. In this configuration, the sliding rails 702 are oriented within a hollow section of the fixed rail 703 in order to decrease the profile of the rail system assembly.

Figure 8:
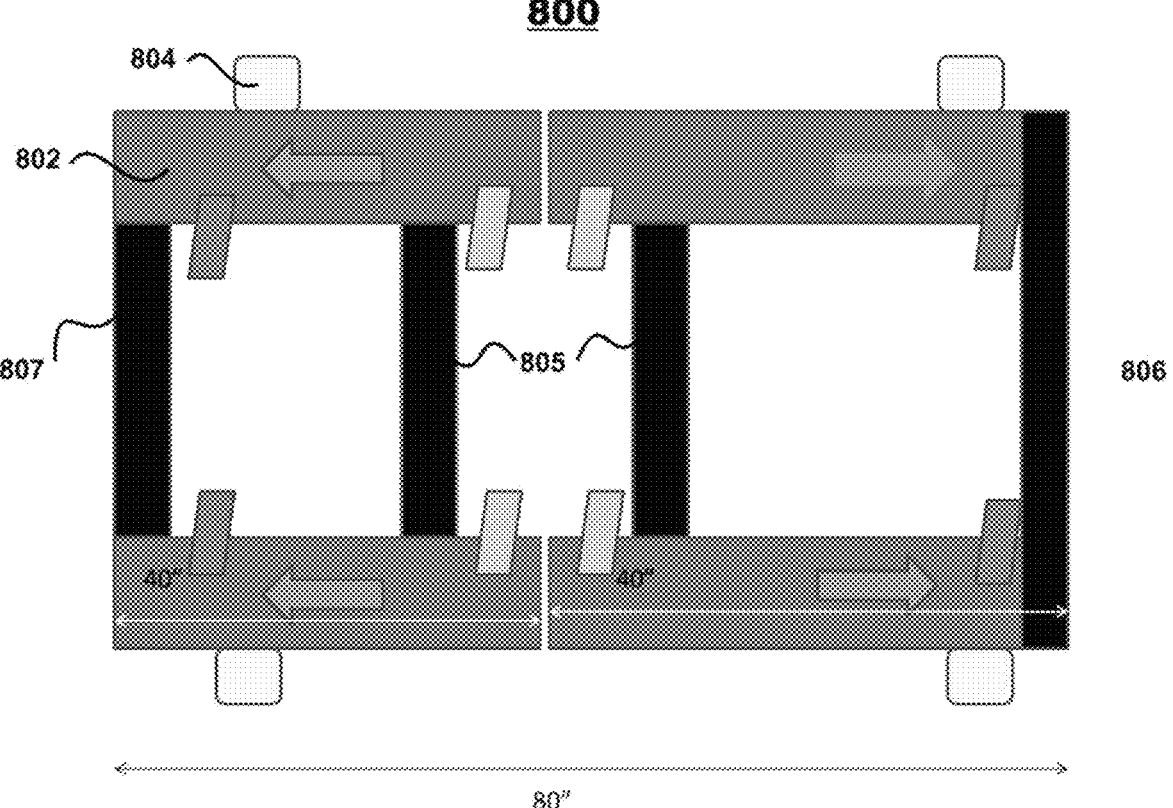
FIG. 8 is a top view of an embodiment of the configurable truck rack system with brackets.

Referring to FIG. 8, a top view of the upper slide assembly, generally designated as 800, is shown with additional components. The figure displays dimensional measurements in this exemplary embodiment, but it should be understood that the present system can be modified and adapted into various other dimensional measurements to accommodate specific application needs.

In the exemplary embodiment, the upper slide assembly measures 80" in length with two slide bars/rails 802 measuring 40" each. The upper slide assembly is mounted on top of 4 posts 804, which are affixed outside of the upper slide assembly. The upper slide assembly may be attached through tension screw connections.

On each of the distal end of the slide bars/rails 802, at least one bracket is installed. The brackets can be a pair of inner brackets and outer brackets. The bracket can function as securing means for other components for the upper slide assembly.

A plurality of crossmembers are secured to the interior of the sliding bars or sliding rails 802. The crossmembers provide structural reinforcement for the upper slide assembly, and can be used to secure items during operation. The crossmembers 805 secured to interior of the sliding rails 802 can be removable according to application needs. One front crossmember 806 is bolted on a distal end of sliding rails 802 to act as a permanently fixed crossmember for functional and structural purposes. The crossmember 807 can be a rear crossmember that can be opened on hinges attached to the sliding rails 802, such that flexible mounting options can be enabled by the truck rack system 800 depending on application needs.

Figure 9:
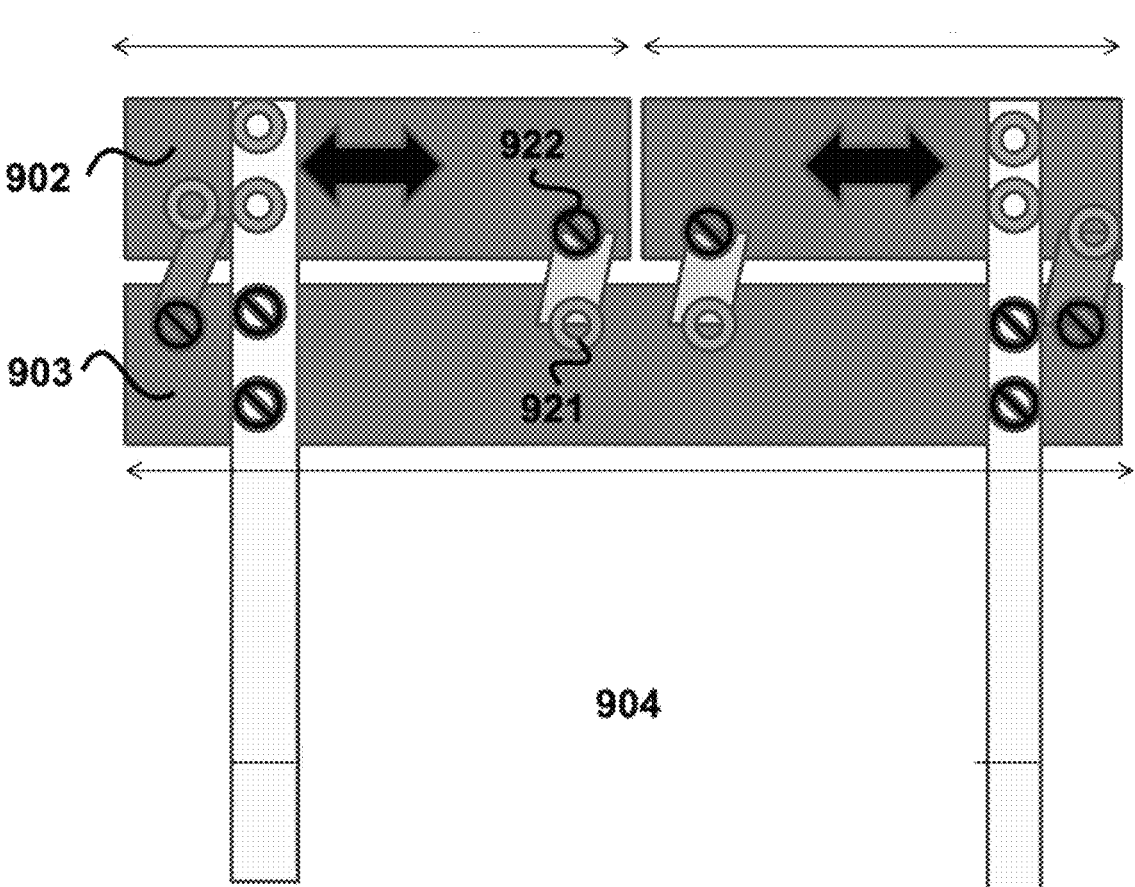
FIG. 9 is a side view of an embodiment of the configurable truck rack system with tension release knobs and locking nuts.

Referring to FIG. 9, a detailed depiction of the structural components for the truck rack 900 is shown. The illustrated assembly is in accordance with the preceding embodiments of the truck rack assembly 900. The truck rack assembly comprises a number of posts 904 to be mounted on the truck bed. A fixed rail 903 and a pair of sliding rails 902 are attached to the posts 904 through mounting brackets and tension secure bolts.

The rack slider assembly measures 80" in this exemplary embodiment. The fixed lower rail 903 measures 80" and the two sliding upper rails 902 measures 40" each. Mounting brackets 922 are put in place to secure the lower fixed rail to upper sliding rail. The mounting brackets on the outer distal ends of the rails are positioned exterior to the rails and the brackets on the inner distal ends of the rail are positioned interior to the rails. Each mounting brackets are affixed onto the corresponding rails with a set of tension release knobs 921 and locking nuts 922. In general, the tension release knobs 922 are placed on the sliding rails 902 and posts 904. The locking nuts 921 are positioned on the fixed rails 903 and the corresponding posts 904.

In the exemplary embodiment, exterior end brackets (located on the outer distal end of the rails) are equipped with fixed anchors 922 on the lower rail 903 and tension release anchors 921 on the sliding rail 902. Interior brackets (located on the inner distal end of the rails) are equipped with fixed anchors 922 on the sliding rail 902 and tension release anchor 921 on the fixed rail 903.

In the exemplary embodiment, the posts 904 are 41.5" from top of the truck bed to top rail 902, with an overall length of 48". The posts 904 are constructed with 6½" bottom to top of the truck bed.

In the exemplary embodiment, a strip of nylon material is fitted between the lower fixed rail 903 and the upper sliding rail 902, such that metal to metal contact is avoided and sliding movement is eased. In other embodiments, strip of material that is conducive to the same movement assisting purpose can be provided.

In operation, the tension release knobs 921 can be adjusted to allow sliding upper rails 902 to be move horizontally parallel to the fixed lower rail 903. The sliding upper rails 902 can be adjusted such that each sliding upper rail 902 can be positioned on top of the truck cab or over the truck bed, in order to facilitate moving and securing items over the length of the truck. The exterior end brackets and interior brackets are used to guide the sliding upper rail 902 during the motion and ensure secure attachment of the rails in motion. Once the adjustment is complete and the sliding rails 902 are in the intended positions, the tension release knobs 921 can be tightened to secure the sliding rail 902 in position. The locking nuts 922 on the fixed rail 903 and post 904 would further support the orientation of the sliding rails 902.

Figure 10:
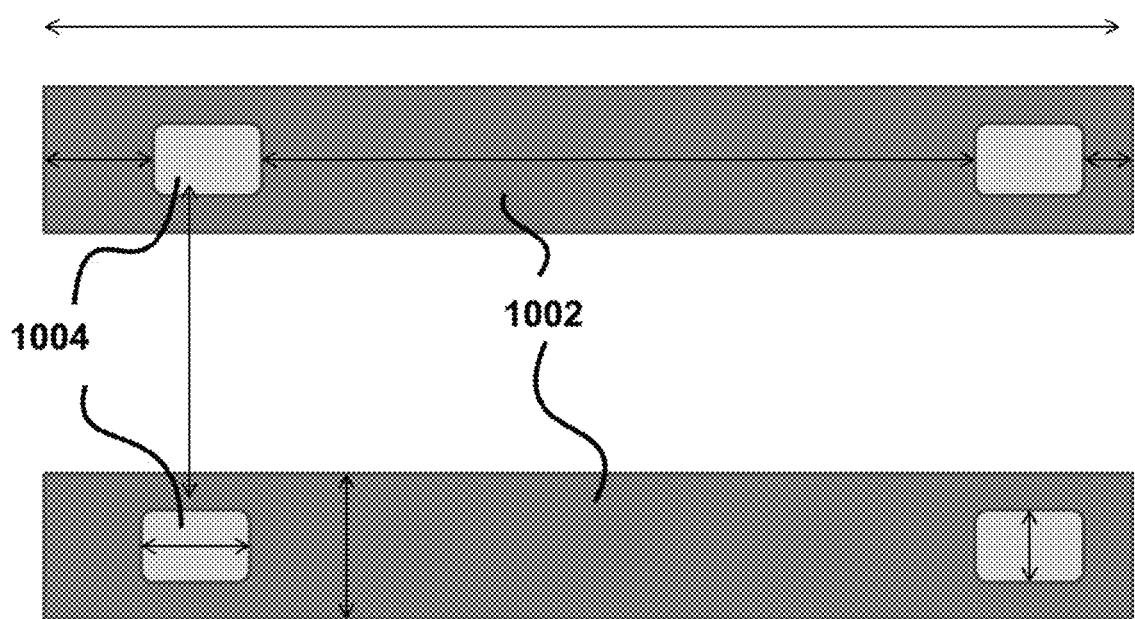
FIG. 10 is a top view of an embodiment of the configurable truck rack system with example dimensions.

Referring to FIG. 10, an exemplary dimensional measurement of the rails is shown. In this embodiment, the rails 1002 are mounted on top of each posts, such that a hole 1004 is oriented on the rail to correspond to the mounting posts. The rail 1002 can be a fixed rail 103 as in FIG. 1, with a length of 80" (or 2032 mm) from end to end. The rails 1002 are positioned 64¾" across inside edge to inside edge (or 1644.65 mm). Each of the mounting hole 1004 is 1¾" (44.45 mm) long and 1⅝" (41.275 mm) wide. The mounting holes 1004 are positioned to be 7" from their outer edge to one end of the rail. On the other end of the rail 1002, another set of mounting holes 1004 are positioned at 4" to the other end of the rail 1002. The holes 1004 are positioned to be 63¼" wide inside edge of hole to inside of hole of truck bed (or 1606.55 mm). The exemplary measurements are not conclusory and can be modified for specific application requirements.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

Supported Features and Embodiments

The detailed description provided above in connection with the appended drawings explicitly describes and supports various features of a configurable truck rack system. By way of illustration and not limitation, supported embodiments include a rack platform, comprising a sliding rail that is configured to move bi-directionally, a fixed rail, and a plurality of crossmembers, wherein the sliding rail is attached to the fixed rail through a number mounting brackets secured by a plurality of tension release knobs and locking nuts, wherein the a slide layer is placed between the sliding rail and the fixed rail, wherein the crossmembers are removably fixed onto the sliding rail and the fixed rail. The truck rack system comprises a plurality of posts, wherein the fixed rail comprises a corresponding number of mounting holes, such that the plurality of posts insert into the plurality of mounting holes, and a plurality of base plates, wherein the plurality of posts are removably attached to the base plates.

Supported embodiments include a truck rack system, wherein the sliding rail comprises a front sliding rail and a rear sliding rail, wherein the front sliding rail moves forwardly and the rear sliding rail moves backwardly, such that the front sliding rail and the ear sliding rail has a combined length equal to that of the fixed rail.

Supported embodiments include a truck rack system, wherein the sliding rail, the fixed rail, the plurality of crossmembers, and the plurality of posts are constructed extruded aluminum.

Supported embodiments include a truck rack system, wherein at least one fixed crossmember is permanently fixed onto the rack platform at one distal end with a plurality of corner brackets.

Supported embodiments include a truck rack system, wherein the at least one moving crossmember is fixed onto the rack platform at one distal end with a plurality of locking bolts, such that the moving crossmember can be adjusted at the locking bolts in a swinging direction.

Supported embodiments include a truck rack system, further comprising attachment means for the sliding rail and the fixed rail.

Supported embodiments include a truck rack system, further comprising a surface component, such that the surface component is removably attached to the rack platform when the rack platform and the posts are removed from the base plates.

Supported embodiments include a truck rack system, further comprising a number of external brackets and a number of internal brackets, wherein the sliding rail is attached to the fixed rail with the external brackets on their external distal end and the internal brackets on their internal distal end.

Supported embodiments include a truck rack system, further comprising cover attachment means, such that a tent can be established from the rack platform.

Supported embodiments include a truck rack system, wherein the posts are attached to the rack platform externally.

What is claimed is:

1. A configurable truck rack system, comprising:
at least one sliding rail connected to a front crossmember on one distal end, a rear crossmember on one other distal end, and a plurality of inner crossmembers located between the front crossmember and the rear crossmember,
a fixed rail comprising a number of mounting holes,
a plurality of posts inserted into the plurality of mounting holes, and
a plurality of base plates, wherein the plurality of posts is removably attached to the base plates,
wherein
the at least one sliding rail is attached to the fixed rail through a number of mounting brackets secured by a plurality of tension release knobs and locking nuts, and a slide layer is placed between the sliding rail and the fixed rail, such that the at least one sliding rail can move bi-directionally in parallel to the fixed rail.

2. The truck rack system of claim 1, wherein the sliding rail comprises a front sliding rail and a rear sliding rail, wherein the front sliding rail moves forwardly and the rear sliding rail moves backwardly, such that the front sliding rail and the ear sliding rail has a combined length equal to that of the fixed rail.

3. The truck rack system of claim 1, wherein the front crossmember is attached to the at least one sliding rail with a corner bracket on each distal end.

4. The truck rack system of claim 1, wherein the rear crossmember comprises a pair of sub rear crossmembers, wherein each of the pair of sub rear crossmembers is attached to the at least one sliding rail with a hinge, such that the pair of sub rear crossmembers open outwardly.

5. The truck rack system of claim 4, wherein the pair of sub rear crossmembers are attached to the at least one sliding rail with a plurality of locking pins.

6. The truck rack system of claim 1, wherein the plurality of posts is attached to the plurality of base plates with a lynch pin.

7. The truck rack system of claim 1, further comprising a surface component that is removably attached to the rack platform.

8. The truck rack system of claim 1, further comprising a number of external brackets and a number of internal brackets, wherein the sliding rail is attached to the fixed rail with the external brackets on their external distal end and the internal brackets on their internal distal end.

9. The truck rack system of claim 1, further comprising cover attachment means, wherein a cover is attached to the sliding rails and the fixed rails with the cover attachment means, such that area surrounding the truck rack system is enclosed by the cover.

10. The truck rack system of claim 1, wherein the posts are adjustable in length, such that the fixed rails and the extended rails can be raised further above ground.

11. A configurable truck rack system, comprising:
a rack platform, comprising a sliding rail that is configured to move bi-directionally, a fixed rail, and a plurality of crossmembers, wherein the sliding rail is attached to the fixed rail through a number mounting brackets secured by a plurality of tension release knobs and locking nuts, wherein a slide layer is placed between the sliding rail and the fixed rail, wherein the crossmembers are removably fixed onto the sliding rail and the fixed rail,
a plurality of posts, wherein the fixed rail comprises a corresponding number of mounting holes, such that the plurality of posts inserts into the plurality of mounting holes, and
a plurality of base plates on a truck bed, wherein the plurality of posts is removably attached to the base plates.

12. The truck rack system of claim 11, wherein the sliding rail comprises a front sliding rail and a rear sliding rail, wherein the front sliding rail moves forwardly and the rear sliding rail moves backwardly, such that the front sliding rail and the ear sliding rail has a combined length equal to that of the fixed rail.

13. The truck rack system of claim 11, wherein the front crossmember is attached to the at least one sliding rail with a corner bracket on each distal end.

14. The truck rack system of claim 11, wherein the rear crossmember comprises a pair of sub rear crossmembers, wherein each of the pair of sub rear crossmembers is attached to the at least one sliding rail with a hinge, such that the pair of sub rear crossmembers open outwardly.

15. The truck rack system of claim 14, wherein the pair of sub rear crossmembers are attached to the at least one sliding rail with a plurality of locking pins.

16. The truck rack system of claim 11, wherein the plurality of posts are attached to the plurality of base plates with a lynch pin.

17. The truck rack system of claim 11, further comprising a surface component that is removably attached to the rack platform.

18. The truck rack system of claim 11, further comprising a number of external brackets and a number of internal brackets, wherein the sliding rail is attached to the fixed rail with the external brackets on their external distal end and the internal brackets on their internal distal end.

19. The truck rack system of claim 11, further comprising cover attachment means, wherein a cover is attached to the sliding rails and the fixed rails with the cover attachment means, such that area surrounding the truck rack system is enclosed by the cover.

20. The truck rack system of claim 11, wherein the posts are adjustable in length, such that the fixed rails and the extended rails can be raised further above ground.

* * * * *